United States Patent
Wilson, II et al.

(10) Patent No.: US 9,799,077 B1
(45) Date of Patent: *Oct. 24, 2017

(54) INSPECTION FACILITY

(71) Applicant: Allstate Insurance Company, Northbrook, IL (US)

(72) Inventors: Thomas Joseph Wilson, II, Chicago, IL (US); Stephen Lawrence Ihm, Kildeer, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/598,549

(22) Filed: May 18, 2017

Related U.S. Application Data

(63) Continuation of application No. 15/271,908, filed on Sep. 21, 2016, now Pat. No. 9,684,934, which is a continuation of application No. 15/216,822, filed on Jul. 22, 2016, which is a continuation of application No. 13/458,388, filed on Apr. 27, 2012, now Pat. No. 9,424,606.

(60) Provisional application No. 61/480,207, filed on Apr. 28, 2011.

(51) Int. Cl.
| | |
|---|---|
| *G06Q 40/08* | (2012.01) |
| *G07C 5/00* | (2006.01) |
| *G07C 5/08* | (2006.01) |
| *H04L 29/08* | (2006.01) |

(52) U.S. Cl.
CPC ............. *G06Q 40/08* (2013.01); *G07C 5/008* (2013.01); *G07C 5/0808* (2013.01); *H04L 67/12* (2013.01)

(58) Field of Classification Search
CPC ...................................................... G06Q 40/08
See application file for complete search history.

(56) References Cited

U.S. PATENT DOCUMENTS

| | | |
|---|---|---|
| 3,308,845 A | 3/1967 | Bellas |
| 3,675,800 A | 7/1972 | Weyant et al. |
| 4,569,531 A | 2/1986 | Beadle |
| 4,981,318 A | 1/1991 | Doane et al. |

(Continued)

FOREIGN PATENT DOCUMENTS

| | | |
|---|---|---|
| CA | 2828017 A1 | 8/2012 |
| CN | 2154815 Y | 2/1994 |

(Continued)

OTHER PUBLICATIONS

May 24, 2017—(US) Non-Final Office Action—U.S. Appl. No. 14/562,036.

(Continued)

*Primary Examiner* — Rajesh Khattar
(74) *Attorney, Agent, or Firm* — Banner & Witcoff, Ltd.

(57) ABSTRACT

An enhanced claims settlement apparatus may process insurance claims rapidly and accurately. The apparatus may first receive a notification of loss associated with an insured item (e.g., car, boat, truck, home, etc.). The apparatus may then apply various algorithms for using sensors to identify, analyze, and estimate the cost of damage associated with the insured item. The sensors that are a part of the enhanced claims settlement server may include cameras, tactile sensors, electromagnetic sensors, etc. that may communicate data to a processor associated with the server. Once the data has been generated and analyzed by the sensors, a claim settlement file may be transmitted to a claimant.

20 Claims, 5 Drawing Sheets

(56) References Cited

U.S. PATENT DOCUMENTS

| | | |
|---|---|---|
| 5,317,503 A | 5/1994 | Inoue |
| 5,343,628 A | 9/1994 | Ham |
| 5,392,388 A | 2/1995 | Gibson |
| 5,657,233 A | 8/1997 | Cherrington et al. |
| 5,673,025 A | 9/1997 | Refugio et al. |
| D396,455 S | 7/1998 | Bier |
| 5,833,294 A | 11/1998 | Williams et al. |
| 6,052,631 A | 4/2000 | Busch et al. |
| D461,822 S | 8/2002 | Okuley |
| 6,554,183 B1 | 4/2003 | Sticha et al. |
| 6,843,599 B2 | 1/2005 | Le et al. |
| 6,920,197 B2 | 7/2005 | Kang et al. |
| 7,089,592 B2 | 8/2006 | Adjaoute |
| 7,497,618 B2 | 3/2009 | Chen et al. |
| 7,602,143 B2 | 10/2009 | Capizzo |
| 7,636,676 B1 | 12/2009 | Wolery et al. |
| 7,889,931 B2 | 2/2011 | Webb et al. |
| 8,061,752 B2 | 11/2011 | Ohnstad et al. |
| 8,095,394 B2 | 1/2012 | Nowak et al. |
| 8,131,417 B2 | 3/2012 | Picard |
| 8,151,209 B2 | 4/2012 | Law et al. |
| 8,311,856 B1 | 11/2012 | Hanson et al. |
| 8,335,606 B2 | 12/2012 | Mian et al. |
| 8,407,139 B1 | 3/2013 | Palmer |
| 8,478,480 B2 | 7/2013 | Mian et al. |
| 8,650,068 B2 | 2/2014 | Esser et al. |
| D722,606 S | 2/2015 | Stroupe et al. |
| 8,954,226 B1 | 2/2015 | Binion et al. |
| D726,741 S | 4/2015 | Lee et al. |
| D727,928 S | 4/2015 | Allison et al. |
| 9,291,544 B1 | 3/2016 | Boyer et al. |
| 9,292,544 B2 | 3/2016 | Binstock et al. |
| 2001/0041993 A1 | 11/2001 | Campbell |
| 2002/0055861 A1 | 5/2002 | King et al. |
| 2002/0072975 A1 | 6/2002 | Steele et al. |
| 2002/0120475 A1 | 8/2002 | Morimoto |
| 2002/0133721 A1 | 9/2002 | Adjaoute |
| 2002/0158968 A1 | 10/2002 | Leitgeb |
| 2002/0161533 A1 | 10/2002 | Uegaki |
| 2003/0028296 A1 | 2/2003 | Miller |
| 2003/0112263 A1 | 6/2003 | Sakai |
| 2003/0120519 A1 | 6/2003 | Candos |
| 2003/0233261 A1 | 12/2003 | Kawahara et al. |
| 2004/0039577 A1 | 2/2004 | Roan et al. |
| 2004/0044549 A1 | 3/2004 | Loop |
| 2004/0103010 A1 | 5/2004 | Wahlbin et al. |
| 2004/0133317 A1 | 7/2004 | Hayakawa et al. |
| 2004/0186744 A1 | 9/2004 | Lux |
| 2005/0046597 A1 | 3/2005 | Hutchison et al. |
| 2005/0083413 A1 | 4/2005 | Reed et al. |
| 2005/0108065 A1 | 5/2005 | Dorfstatter |
| 2005/0125117 A1 | 6/2005 | Breed |
| 2005/0131596 A1 | 6/2005 | Cherrington et al. |
| 2005/0146604 A1 | 7/2005 | Shinada |
| 2006/0114531 A1 | 6/2006 | Webb et al. |
| 2006/0132291 A1 | 6/2006 | Dourney et al. |
| 2006/0155616 A1 | 7/2006 | Moore et al. |
| 2006/0200307 A1 | 9/2006 | Riess |
| 2007/0100669 A1 | 5/2007 | Wargin et al. |
| 2007/0247331 A1 | 10/2007 | Angelis et al. |
| 2007/0250232 A1 | 10/2007 | Dourney et al. |
| 2008/0046261 A1 | 2/2008 | Cunningham |
| 2008/0189142 A1 | 8/2008 | Brown et al. |
| 2008/0222005 A1 | 9/2008 | Schickler |
| 2008/0267487 A1 | 10/2008 | Siri |
| 2008/0281658 A1 | 11/2008 | Siessman |
| 2009/0015585 A1 | 1/2009 | Klusza |
| 2009/0018859 A1 | 1/2009 | Purifoy et al. |
| 2009/0092336 A1 | 4/2009 | Tsurumi |
| 2009/0138290 A1 | 5/2009 | Holden |
| 2009/0150200 A1 | 6/2009 | Siessman |
| 2009/0265193 A1 | 10/2009 | Collins et al. |
| 2009/0290787 A1 | 11/2009 | Stevens et al. |
| 2010/0214797 A1 | 8/2010 | Wang et al. |
| 2010/0293114 A1 | 11/2010 | Khan et al. |
| 2011/0022489 A1 | 1/2011 | Hallowell et al. |
| 2011/0026673 A1 | 2/2011 | Mastronardi et al. |
| 2011/0041088 A1 | 2/2011 | Mason et al. |
| 2011/0060648 A1 | 3/2011 | Weaver et al. |
| 2011/0093159 A1 | 4/2011 | Boling et al. |
| 2011/0209074 A1 | 8/2011 | Gill et al. |
| 2011/0218825 A1 | 9/2011 | Hertenstein |
| 2011/0264582 A1 | 10/2011 | Kim et al. |
| 2011/0313936 A1 | 12/2011 | Sieger |
| 2011/0313951 A1 | 12/2011 | Cook |
| 2012/0029759 A1 | 2/2012 | Suh et al. |
| 2012/0109660 A1 | 5/2012 | Xu et al. |
| 2012/0131504 A1 | 5/2012 | Fadell et al. |
| 2012/0136802 A1 | 5/2012 | McQuade et al. |
| 2012/0245767 A1 | 9/2012 | Beggs et al. |
| 2012/0297337 A1 | 11/2012 | St. Denis et al. |
| 2013/0317861 A1 | 11/2013 | Tofte et al. |
| 2013/0325753 A1 | 12/2013 | Sullivan et al. |
| 2014/0074865 A1 | 3/2014 | Zobrist et al. |
| 2014/0081876 A1 | 3/2014 | Schulz |
| 2014/0082563 A1 | 3/2014 | Kim et al. |
| 2014/0085086 A1 | 3/2014 | Knapp et al. |
| 2014/0095339 A1 | 4/2014 | Cooke |
| 2014/0201022 A1 | 7/2014 | Balzer |
| 2015/0012169 A1 | 1/2015 | Coard |

FOREIGN PATENT DOCUMENTS

| | | |
|---|---|---|
| DE | 4023415 A1 | 2/1991 |
| EP | 982673 A2 | 3/2000 |
| GB | 2468659 A | 9/2010 |
| JP | 11291846 A | 10/1999 |
| JP | 2008269087 A | 11/2008 |
| WO | 8909386 A1 | 10/1989 |
| WO | 2006047266 A1 | 5/2006 |
| WO | 2012082700 | 6/2012 |
| WO | 2013105904 A1 | 7/2013 |

OTHER PUBLICATIONS

"Estimate and manage repairs and process claims"—Retrieved from [http://www.eurotaxglass.com/products-and-services/estimate-and-manage-repairs-and-process-claims/] on Jun. 25, 2014.

"Oracle Depot Repair User Guide"—Retrieved from [http://docs.oracle.com/cd/E18727_01/doc.121/e13606/ T231848T346845.htm#T346883] on Jun. 25, 2014.

"SilverDAT® II"—Retrieved from [http://www.dat.de/en/offers/information-services/silverdat-ii.html] on Jun. 25, 2014.

Jun. 8, 2015—(US) Non-Final Office Action—U.S. Appl. No. 13/458,388.

Oct. 16, 2015—(US) Final Office Action—U.S. Appl. No. 13/458,388.

Oct. 23, 2015—(US) Non-Final Office Action—U.S. Appl. No. 13/728,539.

Aug. 24, 2016—(US) Non-Final Office Action—U.S. Appl. No. 14/933,228.

Dec. 5, 2016—(US) Final Office Action—U.S. Appl. No. 14/561,918.

Jun. 13, 2016—(US) Non-Final Office Action—U.S. Appl. No. 14/465,475.

Jun. 16, 2016—(US) Non-Final Office Action—U.S. Appl. No. 14/561,918.

Jun. 16, 2016—(US) Non-Final Office Action—U.S. Appl. No. 14/562,036.

May 13, 2016—(US) Final Office Action—U.S. Appl. No. 13/728,539.

Nov. 10, 2016—(US) Office Action—U.S. Appl. No. 15/271,908.

Nov. 9, 2016—(US) Final Office Action—U.S. Appl. No. 14/562,036.

Oct. 20, 2016—(US) Office Action—App 13/728,539.

Oct. 27, 2016—(US) Non-Final Offce Action—U.S. Appl. No. 14/465,475.

Apr. 17, 2017—(US) Non-Final Office Action—U.S. Appl. No. 14/465,475.

(56) References Cited

OTHER PUBLICATIONS

Apr. 26, 2017—(US) Non-Final Office Action—U.S. Appl. No. 14/561,918.
May 4, 2017—(US) Final Office Action—U.S. Appl. No. 13/728,539.
Internet archive waybackmachine, https://archive/org/web/ for http://www.puspakom.com.my.
Mobile Vehicle Inspection Unit for ADAC. Retrieved from [http://www.fischerpanda.de/mobile-vehicle-inspection-unit-for-adac.htm] on Mar. 31, 2016.
Motorola MC75 I Mobile pickup and delivery software (POD) with automated fuel truck management, Vehicle Inspection Forms, Mar. 5, 2010 by Admin, 28 pages, http://www.bizspeed.com/tag/motorola-mc75/.
Puspakom Premier Services—Mobile Inspection Unit. Retrieved from [http://www.puspakom.com.my/en/inspections-a-services/range-of-services/premier-mobile-inspection.html] on Mar. 31, 2016.

INSPECTION FACILITY

CROSS-REFERENCE TO RELATED APPLICATIONS

The present application is a continuation of U.S. patent application Ser. No. 15/271,908 entitled "Inspection Facility" and filed Sep. 21, 2016, which is a continuation of U.S. patent application Ser. No. 15/216,822 entitled "Inspection Facility" and filed Jul. 22, 2016, which is a continuation of U.S. patent application Ser. No. 13/458,388 entitled "Enhanced Claims Settlement" and filed on Apr. 27, 2012 (now U.S. Pat. No. 9,424,606), which claims the benefit of U.S. Provisional Patent Application No. 61/480,207 entitled "Enhanced Claims Settlement" and filed on Apr. 28, 2011, each of which is hereby incorporated by reference in its entirety.

TECHNICAL FIELD

Aspects of the disclosure generally relate to an enhanced claims settlement platform through which claims may be settled rapidly and accurately. In particular, aspects of the disclosure allow for insurance claims to be processed and settled through an automated end-to-end process.

BACKGROUND

Handling insurance claims can be a time-consuming and complex process for both the claimant and the claims processor. The claimant often starts the process with a first notice of loss to a claims processing office associated with an insurance company. Usually, a claims adjuster within the claims processing office is assigned to the case to assess the damage for which compensation is sought.

The claims adjustment process can involve paperwork processing, telephone calls, and potentially face-to-face meetings between claimant and adjuster. In addition, time can elapse between a first notice of loss from the claimant and the final settlement of the claim.

BRIEF SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure involve a streamlined and efficient process for claims management and disclose methods, computer readable media, and apparatuses for processing and settling claims related to an insured item quickly and accurately. An enhanced claims settlement server may manage the settlement process from initial notification of loss to final settlement of the claim with a claimant.

In another aspect of the disclosure, an enhanced claims settlement server may communicate with a variety of sensors for assessing damage to insured items.

Further aspects of the disclosure may be provided in a computer-readable medium having computer-executable instructions that, when executed, cause a computer, user terminal, or other apparatus to at least perform one or more of the processes described herein.

Additional aspects of the disclosure may relate to an apparatus comprising: a processor; and a memory configured to store computer readable instructions that, when executed by the processor, cause the processor to perform a method comprising: receiving a notification of an insurance claim associated with an item; using a plurality of sensors, analyzing and estimating a cost of damage associated with the item; based on the analysis and the estimate, generating a claim settlement file that includes the estimate of the cost of damage associated with the item, a list of vendors for repairing the item; and a payment to the claimant for the insurance claim.

Moreover, additional aspects of the disclosure relate to a method comprising: receiving, from a user device operated by a claimant, a notification of an insurance claim associated with an item; using a plurality of sensors associated with a processor of an enhanced claims settlement server, analyzing and estimating a cost of damage associated with the item; based on the analysis and the estimate, using the processor, generating a claim settlement file that includes the estimate of the cost of damage associated with the item, a list of vendors for repairing the item; and a payment for compensating the claimant for the insurance claim.

BRIEF DESCRIPTION OF THE DRAWINGS

The present disclosure is illustrated by way of example and is not limited in the accompanying figures in which like reference numerals indicate similar elements and in which.

DETAILED DESCRIPTION

In accordance with various aspects of the disclosure, methods, computer-readable media, and apparatuses are disclosed in which insurance claims may be settled through an enhanced automated process. In certain aspects, an enhanced claims settlement server manages the claims settlement process from an initial notice of loss to transmittal of an appropriate payment for the claim.

The automated process may utilize various hardware components (e.g., processors, communication servers, memory devices, sensors, etc.) and related computer algorithms to examine an insured item after a claim has been filed for that item and to generate a settlement file that may include information regarding an estimate of the damage caused to the item, approved vendors and available times for repairing and/or replacing the item, and a payment and/or wire transfer to a claimant or vendor for the loss.

Figure 1:
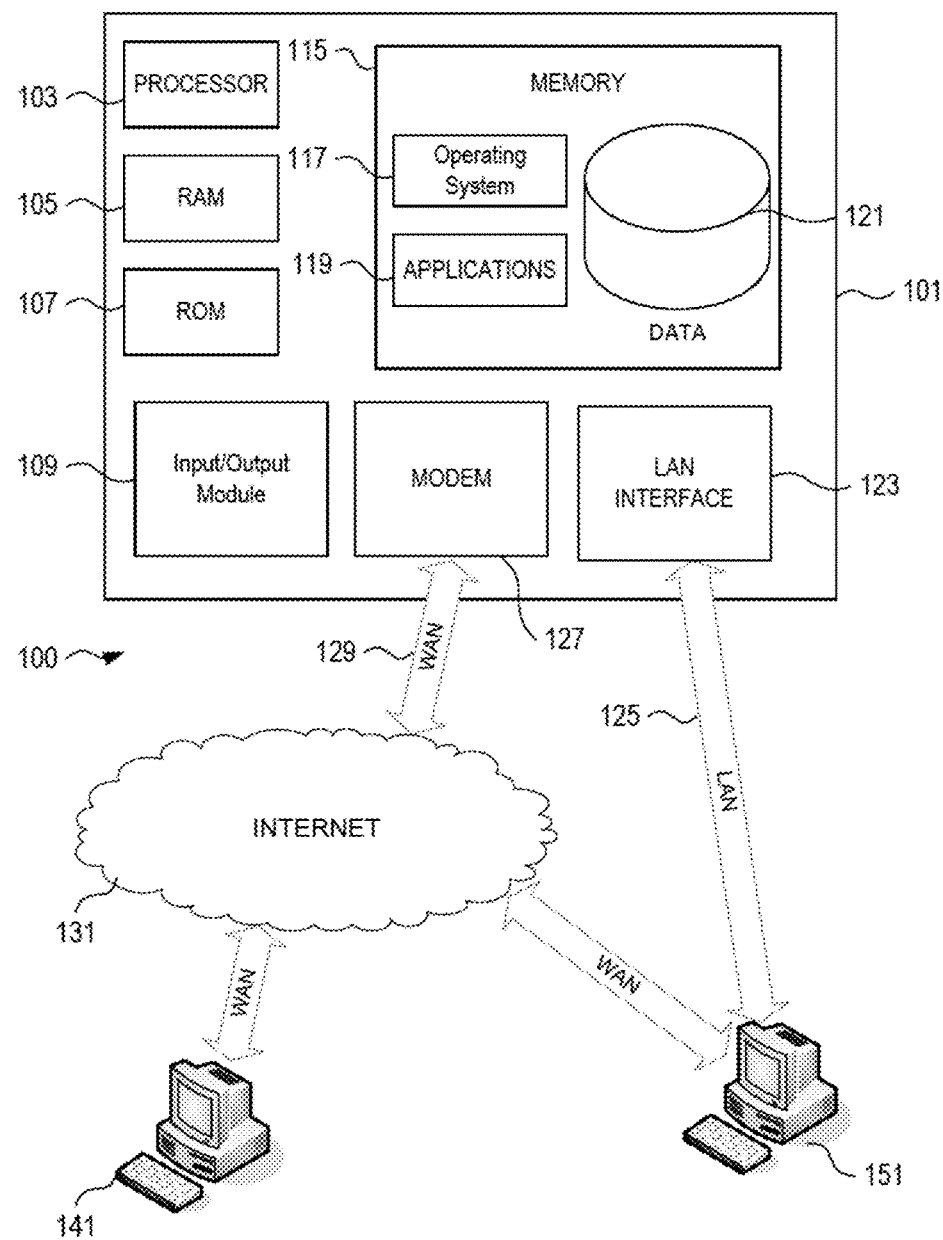
FIG. 1 shows an illustrative operating environment in which various aspects of the disclosure may be implemented.

FIG. 1 illustrates a block diagram of an enhanced claims settlement server 101 in communication system 100 that may be used according to an illustrative embodiment of the disclosure. Enhanced claims settlement server 101 may have a processor 103 for controlling overall operation of the enhanced claims settlement server 101 and its associated components, including RAM 105, ROM 107, input/output module 109, and memory 115.

Input/output module 109 may include a microphone, keypad, touch screen, and/or stylus through which a user of enhanced claims settlement server 101 may provide input, and may also include one or more of a speaker for providing audio output and a video display device for providing textual, audiovisual and/or graphical output. Software may be stored within memory 115 to provide instructions to processor 103 for enabling enhanced claims settlement server 101 to perform various functions. For example, memory 115 may store software used by the enhanced claims settlement server 101, such as an operating system 117, application programs 119, and an associated database 121. Processor 103 and its associated components may allow the enhanced claims settlement server 101 to run a series of computer-readable instructions to determine an estimate of loss suffered by a claimant and generate the appropriate payment for the loss. In addition, processor 103 may determine an approved list of vendors for replacing and/or repairing an item that relates to a claim. Processor 103 may also schedule and accept appointments with vendors that may aid in repairing/replacing the item.

The enhanced claims settlement server 101 may operate in a networked environment supporting connections to one or more remote computers, such as terminals 141 and 151. The terminals 141 and 151 may be personal computers or servers that include many or all of the elements described above relative to the enhanced claims settlement server 101. Also, terminal 141 and/or 151 may be sensors such as cameras and other detectors that allow damage related to an insured item for which a claim has been filed to be assessed. The network connections depicted in FIG. 1 include a local area network (LAN) 125 and a wide area network (WAN) 129, but may also include other networks. When used in a LAN networking environment, the enhanced claims settlement server 101 is connected to the LAN 125 through a network interface or adapter 123. When used in a WAN networking environment, the enhanced claims settlement server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the enhanced claims settlement server 101 according to an illustrative embodiment of the disclosure may include computer executable instructions for invoking functionality related to settling an insurance claim quickly and accurately (e.g., seconds or minutes). In one embodiment, the entire claim settlement process discussed herein may occur in ten minutes or less.

Enhanced claims settlement server 101 and/or terminals 141 or 151 may also be mobile and/or portable terminals including various other components, such as a battery, speaker, and antennas (not shown). In this regard, enhanced claims settlement server 101 may be a handheld or otherwise portable device that may be used to scan and process an insured item from all relevant angles.

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including non-transitory memory storage devices, such as a hard disk, random access memory (RAM), and read only memory (ROM).

Figure 2:
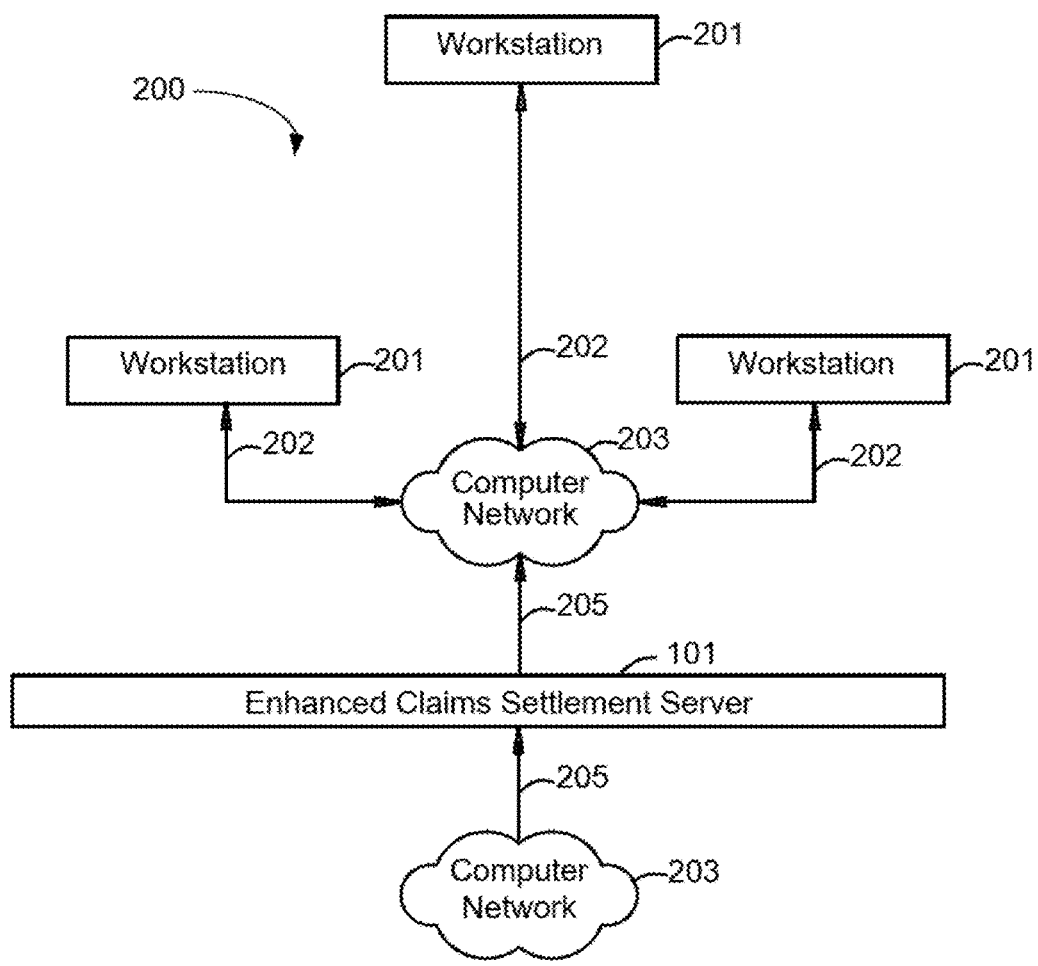
FIG. 2 shows a block diagram of workstations and servers that may be used to implement the processes and functions of certain aspects of the present disclosure.

Referring to FIG. 2, a system 200 for implementing methods according to the present disclosure is shown. As illustrated, system 200 may include one or more workstations/servers 201. Workstations 201 may be local or remote, and are connected by one or more communications links 202 to computer network 203 that is linked via communications links 205 to enhanced claims settlement server 101. In certain embodiments, workstations 201 may run different algorithms used by enhanced claims settlement server 101 for settling a claim submitted by a claimant, or, in other embodiments, workstations 201 may be different types of sensors that provide information to enhanced claims settlement server 101 for assessing damage to an insured item for which a claim has been filed. In system 200, enhanced claims settlement server 101 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and enhanced claims settlement server 101, such as network links, dial-up links, wireless links, hard-wired links, etc.

Figure 3:
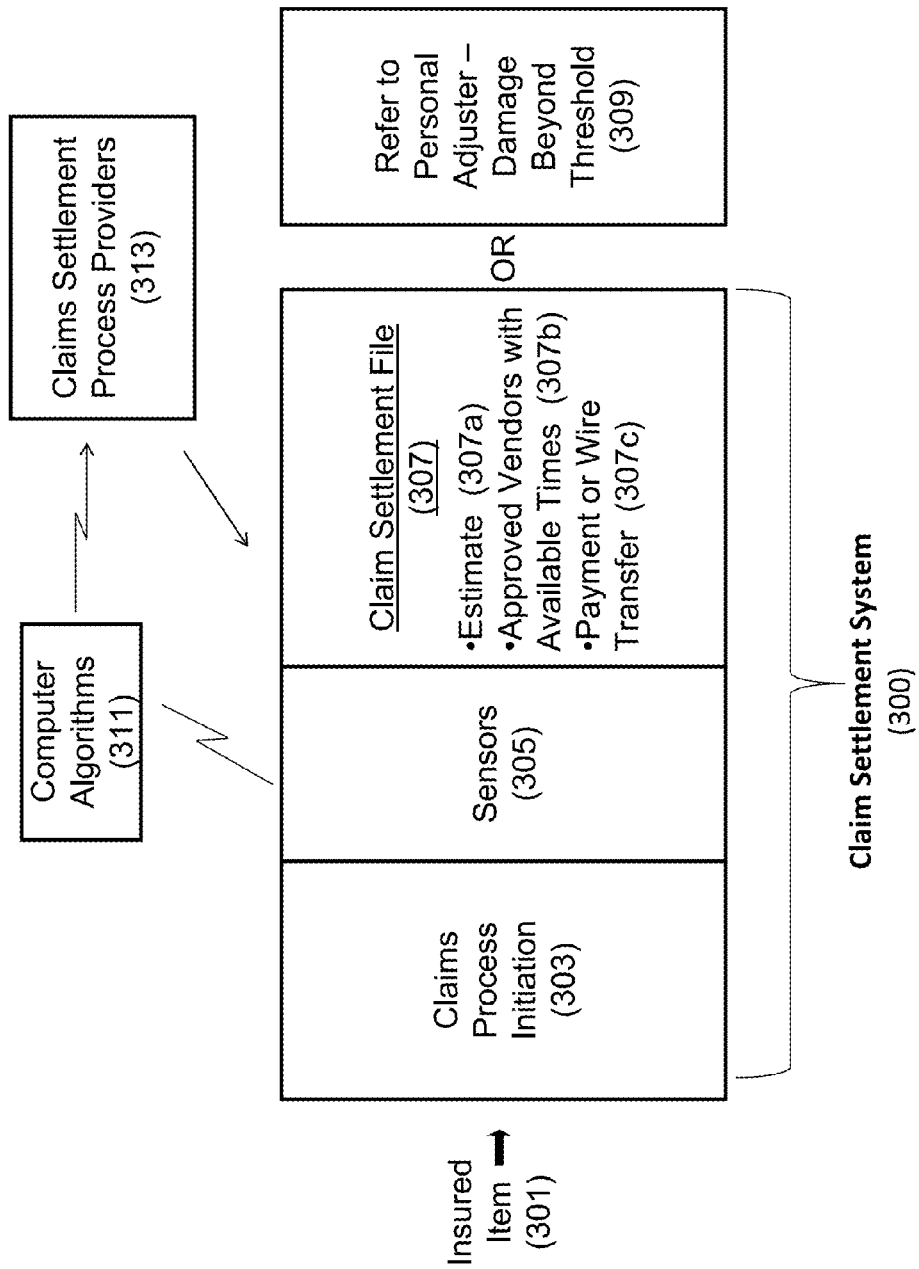
FIG. 3 shows a diagram of a first process flow using an enhanced claims settlement server in accordance with at least one aspect of the present disclosure.

FIG. 3 shows a diagram of a first process flow 300 using an enhanced claims settlement server 101 in accordance with at least one aspect of the present disclosure. The process 300 may start out with a first notification of loss associated with an insured item 301 to enhanced claims settlement server 101. The notification may be an automated notification of an accident from a telematics device, smart phone, and/or other device to enhanced claims settlement server 101. In certain embodiments, if the accident is associated with a vehicle (e.g., car, truck, boat, etc.) the telematics device and/or smart phone may include an impact sensor that automatically transmits a notification of the accident involving the vehicle to enhanced claims settlement server 101 when certain impact parameters are detected. Additional information such as speed, braking or acceleration for the time period immediately preceding and immediately subsequent to the accident as well as vehicle identifying information or insured information also may be transmitted by the telematics device and/or smart phone and the enhanced claims settlement server 101. The vehicle identifying information may include license plate number, vehicle identification number, and/or vehicle make/model.

In other embodiments, the claim settlement process 300 may be initiated 303 by the swipe of an insurance card or card including identification information (such as a credit card) through a sensor or card reader 305 of enhanced claims settlement server 101. The insurance card or other card including identification information may include information related to the identity of the claimant (e.g., name, date of birth, terms of active insurance policies, etc.). In other embodiments, the claim settlement process 300 may be initiated by driving to a predetermined location associated with server 101 and having a license plate and/or vehicle identification number (VIN) read by a processor 103 (e.g., when the insured item 301 is a vehicle).

In certain aspects, the claim settlement process 300 may use one or more sensors 305 that are a part of or in communication with enhanced claims settlement server 101 to assess damage associated with insured item 301. The sensors 305 may function simultaneously or sequentially (e.g., insured item 301 may be moved from one sensor station to another) to gather data about damage related to item 301.

The sensors 305 that are a part of enhanced claims settlement server 101 may include various types of cameras (e.g., movable cameras, etc.) for taking optical digital images and/or other computing/mechanical devices 201 that may make laser and/or tactile measurements. The sensors 305 may also measure the interaction of pressure (e.g., sound) waves or X-rays on the insured item 301 to analyze damage to the insured item 301. In yet other embodiments, various types of imaging technologies may be used to analyze the insured item 301. For instance, magnetic resonance imaging (MRI), infrared imaging, 3-d imaging technologies (e.g., holographic imaging, etc.), and/or various types of tomography may be used to image insured item 301. The sensors 305 may also sense fluids such as transmission fluids, brake fluids, engine oil, etc. leaking from insured item 301. In other embodiments, sensors 305 may sense various aspects of tires that are a part of insured item 301 (e.g., when insured item 301 is a vehicle). For instance, sensors 305 may indicate that a frame associated with a body or a rim associated with a tire of insured item 301 is bent.

When the insured item 301 is a vehicle, enhanced claims settlement server 101 may also dock with an on-board diagnostic (OBD) or OBD-II system that may be a part of the vehicle's electronics system. The information recorded by the OBD and/or OBD-II system may include coolant temperature, engine RPM, vehicle speed, timing advance, throttle position, and the oxygen sensor, among other things. The OBD/OBD-II system or other system may also be used by enhanced claims settlement server 101 to check the mileage in a vehicle for underwriting and/or pricing purposes. All of this information may be used by enhanced claims settlement server 101 to evaluate any damage to insured item 301.

In addition to gathering information through various sensors, enhanced claims settlement server 101 may also include a computer interface for a claimant to input information and/or answer questions (e.g., an automated questionnaire, etc.) around prior damage, liability, particulars of an accident, etc.

In certain aspects, enhanced claims settlement server 101 may be configured to detect fraudulent claims. For instance, the automated questionnaire discussed above may also ask about an accident associated with the claim. The answers to the questions regarding the accident may be compared to the actual damage or sensor or OBDII readings associated with insured item 301. If enhanced claims settlement server 101 determines that there are discrepancies between the actual damage or sensor or OBDII readings associated with insured item 301 as assessed by sensors 305 and a description of the damage provided in the answers to the automated questionnaire, then enhanced claims settlement server 101 may notify a claims adjuster (e.g., adjuster 309, discussed below) to intervene or take other action such as to terminate the claim. Also, if insured item 301 is a vehicle, server 101 may compare particulars about the vehicle (e.g., make, model, year of manufacture, VIN, etc.) to previously-obtained vehicle information (e.g., stored in a memory associated with server 101 and/or on file with an entity managing server 101) for detecting fraud. Further, if after further analysis, the number of false positives for detecting fraud is beyond a predetermined threshold, the algorithm and/or questions used to detect fraud may be adjusted accordingly.

As another example, enhanced claims settlement server 101 may be able to determine the speed of the insured item 301 (e.g., a vehicle) when an accident occurs. The speed determined by enhanced claims settlement server 101 may be compared with the speed indicated by a claimant in the questionnaire. Finally, the enhanced claims settlement server 101 may also be able to determine the number of people and the positions of each individual in the insured item 301 (e.g., a vehicle) when an accident occurs. This information may also be compared with the corresponding descriptions indicated by a claimant in the questionnaire.

In other aspects, enhanced claims settlement server 101 may be able to interface with other databases/systems. For instance, server 101 may interface with meteorological databases to retrieve the weather conditions at the time of an accident associated with insured item 301. Server 101 may also interface with law enforcement databases to retrieve police reports of an accident associated with insured item 301 or with medical records or other databases related to people involved in an accident associated with the insured item 301.

Once the insured item 301 has been adequately analyzed by sensors 305, enhanced claims settlement server 101 may then generate a claim settlement file 307. In certain aspects, enhanced claims settlement server 101 may automatically generate claim settlement file 307. The claim settlement file 307 may include an estimate 307*a* of the damage to insured item 301, approved vendors 307*b* with available times for repairing and/or replacing insured item 301, a list of parts and part vendors for repairing the insured item 301, a list of replacements and replacement sources for the insured item 301 and various portions of insured item 301 where repair is not feasible, and a payment or wire transfer 307*c* by an entity (e.g., an insurance company) managing enhanced claims settlement server 101 to an insured of insured item 301 (e.g., the claimant) for the assessed damage associated with insured item 301, among other things. In addition to or alternatively, if the owner of insured item 301 is to be provided compensation for loss/damage to insured item 301, enhanced claims settlement server 101 may generate a payment card (e.g., a prepayment card) that may be used by the owner of insured item 301.

In another aspect of the disclosure, claim settlement file 307 may stipulate various terms of the settlement, including discounts provided to an owner of the insured item 301 for errors on the part of enhanced claims settlement server 101.

For instance, the claims settlement file 307 may provide for a predetermined discount (e.g., 10% off) for any out-of-pocket expense associated with replacing/repairing the insured item 301 if the enhanced claims settlement server 101 does not detect all of the damage associated with insured item 301 (e.g., hidden damage) and/or if the estimate 307*a* of the damage to insured item 301 is not accurate (e.g., as determined by an adjustor or a third party vendor such as a repair shop). Moreover, once the claim settlement file 307 has been generated by enhanced claims settlement server 101, the information in file 307 may be transmitted to an owner of insured item 301.

In general, the claim settlement file 307 may resolve all the issues associated with settling a claim involving insured item 301. Alternatively and/or additionally, if the claim settlement file 307 does not resolve all the issues (e.g., damage cannot be assessed, disagreement between the claimant and the enhanced claims settlement server 101, etc.) or for verification or training associated with settling a claim involving insured item 301, the enhanced claims settlement server 101 may refer a claimant to a personal adjuster 309 for generating or verifying a finalized estimate of any damage.

The adjuster 309 may view the insured item 301 through a video feed and enhanced claims settlement server 101 may manipulate sensors 305 (e.g., cameras, etc.) to capture a desired view. For instance, the enhanced claims settlement server 101 may allow the adjuster to communicate via an electronic interface that instructs the server 101 to move sensors 305 to a given angle. Alternatively or in addition, insured item 301 may be directly manipulated by sensors 305 (e.g., mechanical arms, etc.) to allow adjustor 309 to examine a desired view of the insured item 301. For instance, the adjuster may instruct server 101 to move robotic arms or lifts that are able to position the insured item 301 so that the adjuster can view an appropriate portion of insured item 301.

As mentioned above, enhanced claims settlement server 101 may generate holograms (e.g., based on magnetic resonance imaging (MM) or other techniques using predictive computer-aided design (CAD)-type technologies, etc.) for allowing adjusters and other individuals to view the insured item 301. The holograms may represent three-dimensional images of insured item 301 and may allow individuals to view the exterior of insured item 301 as well as features internal to insured item 301. For instance, a hologram may allow the different components comprising a vehicle's engine to be viewed and analyzed in ways that would not be feasible with traditional imaging modalities.

In some aspects, computer algorithms 311 which may be used in determining damage may be based on specifications and/or tolerances data related to a manufacturer of insured item 301. The computer algorithms 311, which may be stored in a memory 115 of enhanced claims settlement server 101, may also direct enhanced claims settlement server 101 to automatically delete any photos non-relevant to damage of/data related to insured item 301 based on a comparison of the photos/data to manufacturer specifications/tolerances. Once the data/photos related to insured item 301 are generated by various sensors 305 and/or once the claim settlement file 307 is generated by enhanced claims settlement server 101, the enhanced claims settlement server 101 may allow access of the file 307 and/or data/photos to an individual/group associated with insured item 301 (e.g., the claimant, etc.). In some embodiments, claim settlement process providers 313 may receive the payment 307*c* so that they may transmit the payment 307*c* to either the claimant, vendor, or a third party vendor (e.g., for repairing/replacing insured item 301).

In other aspects, enhanced claims settlement server 101 may automatically apply a deductible amount to any claim settlement file 307 generated through process 300. In addition, enhanced claims settlement server 101 may also automatically generate cross-sell material (e.g., other products/services offered by the entity managing enhanced claims settlement server 101) for review while a claimant waits for a claim settlement file 307 to be generated. For instance, if the entity managing enhanced claims settlement server 101 is an insurance company, the enhanced claims settlement server 101 may generate information about other types of insurance products offered by the insurance company while the claimant is waiting for the claim settlement.

In certain aspects, the entire process 300 may be highly automated and, therefore, completed in a short amount of time (e.g., seconds, minutes, etc.).

Figure 4:
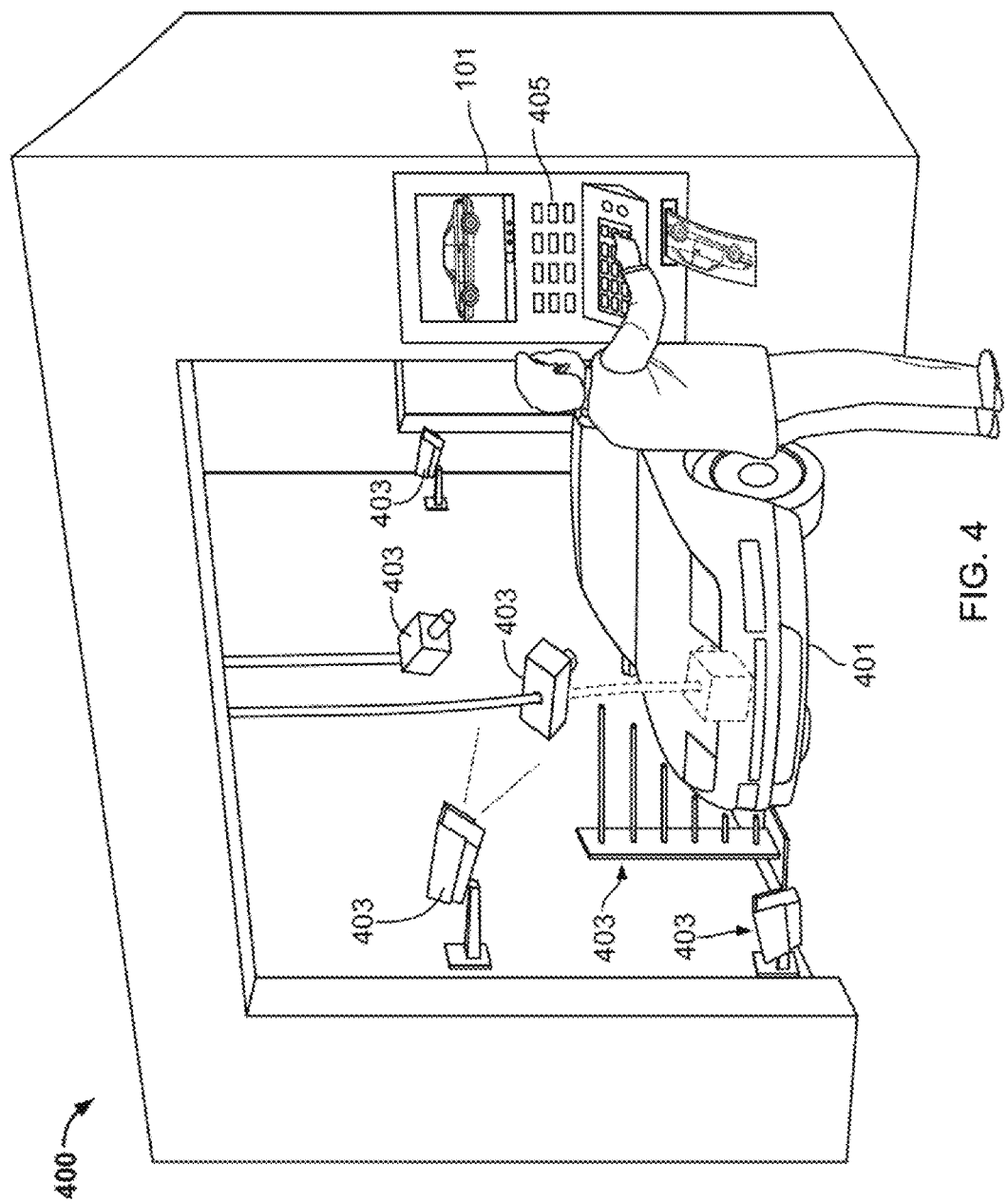
FIG. 4 illustrates an enhanced claims settlement apparatus in accordance with at least one aspect of the present disclosure.

FIG. 4 illustrates an enhanced claims settlement apparatus 400 employing an enhanced claims settlement server 101 in accordance with various aspects of the present disclosure. FIG. 4 shows an example of how the enhanced claims settlement server 101 may be used when the insured item 301 is a vehicle 401. In FIG. 4, an owner of vehicle 401 may file a claim for damage to vehicle 401. The owner may notify enhanced claims settlement server 101 through any of the various modalities mentioned above, including automatic notification via a telematics device, through manual notification, and/or by simply driving to a predetermined location associated with server 101. Vehicle 401 may be analyzed by various sensors 403 (e.g., cameras, tactile sensors, ultrasonic sensors, electromagnetic sensors, etc.), which may be a part of enhanced claims settlement apparatus 400, to determine damage caused to vehicle 401 so that a claim settlement file 307 may be generated by enhanced claims settlement server 101. Enhanced claims settlement server 101 may also include a user interface 405 through which a user may perform various activities. For instance, a user may swipe an insurance card associated with vehicle 401 through user interface 405. In addition, a user may, through user interface 405, view/print photos, data, and other information generated by enhanced claims settlement server 101.

Figure 5:
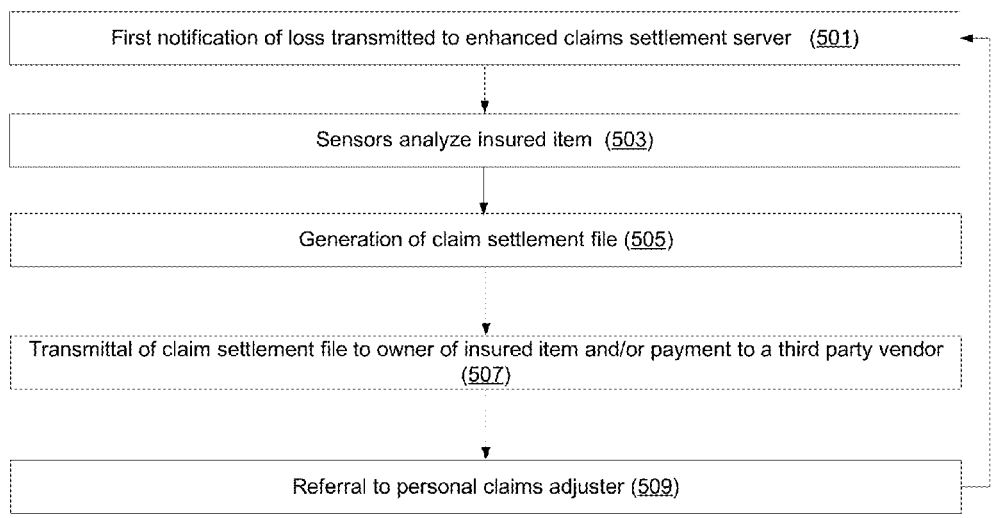
FIG. 5 illustrates a second process flow using an enhanced claims settlement server in accordance with at least one aspect of the present disclosure.

FIG. 5 illustrates a second process flow using an enhanced claims settlement server 101 in accordance with at least one aspect of the present disclosure. The process of FIG. 5 may start out at step 501 where a first notification of loss may be transmitted to an enhanced claims settlement server 101. As mentioned earlier, this notification may occur in various ways; for instance, either an automatic or a manual notification may be transmitted from a communication device operated by an owner/operator of an insured item 301 (e.g., the claimant) and/or the insured item 301 (e.g., a vehicle) may be driven to a predetermined location associated with server 101. Alternatively or in addition, the first notification of loss may occur through the swipe of an insurance card or other id card through a sensor 305 (e.g., a card reader) associated with enhanced claims settlement server 101. After this initial notification, the process may move to step 503 where sensors 305 may analyze damage related to insured item 301. For instance, as shown in FIG. 4, if the insured item 301 is a vehicle 401, the enhanced claims settlement server 101 may house and/or be in communication with a number of sensors 403 (e.g., cameras, electromagnetic sensors, ultrasound sensors, etc.) that generate photos, data, and other information about the damage associated with the vehicle 401.

These photos and data may be analyzed through various algorithms stored as computer-executable instructions on enhanced claims settlement server 101. Enhanced claims settlement server 101 may store predefined rules for determining key areas of insured item 301 to analyze and/or image. For instance, if the insured item 301 is a vehicle 401, the enhanced claims settlement server 101 may use object recognition algorithms and/or imaging software to determine the make/model of the vehicle 401 and to compare photos of portions of a damaged vehicle 401 with photos of similar portions of an undamaged vehicle, such as photos obtained from a manufacturer's specification. The object recognition algorithms and/or imaging software may track one or many multiple specific points of a portion of the vehicle to determine which portions may be damaged. For instance, to determine if a door has actually been damaged, the algorithms and/or software may track the center of a door to determine if the center is at an appropriate distance from an edge of the door. This analysis may also be used to determine the extent or level of damage to the car door (e.g., repair versus replace). As another example, the enhanced claims settlement server may use infrared imaging technology to image the temperature of various components within a vehicle's engine. By cross-referencing the temperature profile with the heat tolerances set by the manufacturer, enhanced claims settlement server 101 may determine that the vehicle 401 may need certain engine components replaced (e.g., a new timing belt, muffler, etc.). As yet another example, tactile sensors that contact the contour of a vehicle 401 may determine that certain body parts associated with the vehicle 401 have dents and/or scratches that require repair.

In other aspects, the object recognition algorithms and/or imaging software used to determine the make/model of the vehicle may be defined by manufacturer or after-market specifications and appropriate tolerances. For instance, a manufacturer specification may define the exact dimensions of a car door and/or an engine part. Because each manufacturer specification may have different definitions and tolerances, enhanced claims settlement server 101 may be able to retrieve the appropriate specification based on predefined criteria.

In analyzing the damage to the insured item 301, the enhanced claims settlement server 101 may also determine the level of a particular damage. For example, the enhanced claims settlement server 101 may determine whether the damage to the item 301 is small enough to be repaired or large enough to require replacement of the item 301 and/or a part of the item 301.

After sensors 305 gather and analyze data associated with insured item 301, the process of FIG. 5 may then move to step 505 where enhanced claims settlement server 101 may generate a claims settlement file 307. The claims settlement file 307 may be generated by determining the extent of the damage to insured item 301 and then cross-referencing pricing information accessible to enhanced claims settlement server 101. For instance, in the example of damage associated with a vehicle 401, enhanced claims settlement server 101 may access pricing information for replacing the vehicle 401 or a part of vehicle 401 and/or for repairing the damage to vehicle 401 stored in internal databases associated with enhanced claims settlement server 101. In addition, enhanced claims settlement server 101 may access this information in remotely stored databases and/or through pricing information from vendors found on the Internet. The analysis of the data generated from sensors 305 and the pricing information cross-referenced from this analysis may form the basis for the claim settlement file 307 generated in step 505.

As mentioned earlier, the claim settlement file 307 may include a cost estimate 307*a* for replacing/repairing insured item 301, a list of vendors 307*b* that will repair/replace insured item 301 with their contact information (phone number, address, etc.) and the hours of availability, and a payment or wire transfer 307*c* that may serve as compensation for the loss suffered by the owner of insured item 301, among other things. The enhanced claims settlement server 101 may generate the list of vendors and associated information by accessing information stored in internal/remote databases (e.g., accessing the web pages of the vendors). To determine the vendors that are most convenient for a particular claimant, the enhanced claims settlement server 101 may include a global positioning system (GPS) that maps the closest distance of various vendors with the home/work address of the claimant.

The process of FIG. 5 may then move to step 507 where the information in the claim settlement file 307 generated in step 505 may be transmitted to the claimant. In some embodiments, the claimant may access the information in claim settlement file 307 through a user interface associated with enhanced claims settlement server 101, such as user interface 405. In other embodiments, the claimant may receive the information through an electronic device owned by the claimant (e.g., laptop, mobile phone, personal digital assistant (PDA), etc.). After the claimant receives the information in claim settlement file 307, the claimant may use the information for replacing and/or repairing the insured item 301. In particular, if the damage to insured item 301 is greater than a predetermined threshold, the claimant may use the information in claim settlement file 307 for finding a replacement for insured item 301 (e.g., a new car, etc.). In other embodiments, the payment 307*c* associated with a claim settlement file 307 may be transmitted directly to one of the approved vendors associated with replacing/repairing insured item 301. The claimant may then take insured item 301 to the vendor to have the item 301 repaired and/or replaced. In yet other embodiments, several different vendors may bid on how much repairing and/or replacing insured item 301 will cost. In this instance, enhanced claims settlement server 101 may transmit data related to the damage (e.g., photos, other sensor-generated data, etc.) to allow the vendors to generate a price quote. Once the enhanced claims settlement server 101 receives bids from all the vendors, the enhanced claims settlement server 101 may select the best (e.g., based on factors such as quality, location, and price) bid for repairing/replacing insured item 301.

If there are any unresolved issues in the claim settlement file and/or if the claimant has any unanswered questions, the process may optionally move to step 509 where the claimant may be referred to a personal claims adjuster. In other cases, a personal claims adjuster may receive the case if the damage to insured item 301 is beyond a predetermined threshold. In this embodiment, the claims settlement process discussed in FIG. 3 may never move forward; instead, the claims case may go directly to a personal claims adjuster.

In some embodiments, vendors/claimants may transmit feedback to enhanced claims settlement server 101 so that enhanced claims settlement server 101 may determine the accuracy of the estimate 307*a* for the cost of damage to insured item 301, as stated in the claim settlement file 307. In this case, the computer-executable program instructions stored on enhanced claims settlement server 101 may be updated as needed to create more accurate estimates. For instance, if the enhanced claims settlement server 101 repeatedly predicts that the cost of replacing a certain type of damage to a car door is $200 above what is being charged by vendors, the computer-executable program instructions stored on enhanced claims settlement server 101 may be updated (e.g., the algorithm may be changed) to reduce the estimate generated when sensors 305 detect this type of damage in the future. Further yet, if enhanced claims settlement server 101 predicts that damage to a vehicle is so severe that the vehicle needs to be replaced and feedback indicates that repair shops are able to fix the damage for a predetermined amount, the computer-executable program instructions stored on enhanced claims settlement server 101 may be similarly updated to correctly associate the types of damage with the vehicle to whether the vehicle needs to be replaced or repaired.

One of ordinary skill in the art would recognize that the methods and systems discussed herein may be applied to all forms of insurance (e.g., home, auto, etc.) and financial services. For instance, the methods/systems of this disclosure (e.g., enhanced claims settlement server 101, handheld devices, etc.) may be used to process a homeowner's claim (e.g., for an insured home).

Aspects of the invention have been described in terms of illustrative embodiments thereof. Numerous other embodiments, modifications and variations will occur to persons of ordinary skill in the art from a review of this disclosure. For example, one of ordinary skill in the art will appreciate that the steps discussed herein may be performed in other than the recited order, and that one or more steps may be optional in accordance with aspects of the invention.

What is claimed is:

1. An inspection system comprising:
    an analysis location at which a vehicle is positioned wherein the analysis location includes a plurality of cameras and wherein the plurality of cameras are configured to generate data characterizing one or more conditions of the vehicle when the vehicle is at the analysis location;
    a computing device communicatively connected with the plurality of cameras and comprising a memory having instructions that, when executed, cause the computing device to:
        initiate execution of an inspection algorithm that carries out an inspection of the vehicle in response to receiving the vehicle at the analysis location wherein the computing device, during execution of the inspection algorithm, controls operation of at least one of the plurality of cameras,
        receive from the plurality of cameras, the data characterizing the one or more conditions of the vehicle,
        execute an assessment algorithm that causes the computing device to analyze the data and identify damage to the vehicle based on the data, and
        execute an estimation algorithm that causes the computing device to estimate an amount to repair the vehicle based, at least in part, on the damage identified.

2. The system of claim 1 further comprising: a card reader communicatively connected with the computing device and configured to provide notification of an insurance claim related to the vehicle, the notification responsive to a swipe of an insurance card or a credit card through the card reader.

3. The system of claim 1, wherein the memory further causes the computing device to receive, from a device configured to detect vehicle accidents, a first notice of loss related to the vehicle in response to detecting, by the device, an accident involving the vehicle.

4. The system of claim 3, wherein the first notice of loss comprises telematics information collected by the device during operation of the vehicle.

5. The system of claim 4, wherein the telematics information comprises one or more speed measurements, one or more braking measurements, and one or more acceleration measurements of the vehicle either before, after, or before and after a time the accident occurred.

6. The system of claim 4, wherein the telematics information comprises one or more vehicle parameters collected via an on-board diagnostic (OBD) system associated with the vehicle.

7. The system of claim 6, wherein the one or more vehicle parameters comprise one or more of a vehicle mileage measurement, a coolant temperature measurement, an engine speed measurement, a timing advance measurement, a throttle position measurement, and one or more readings from an oxygen sensor in the vehicle.

8. The system of claim 1, wherein the instructions, when executed, further cause the computing device to provide an interface that presents a plurality of questions to an individual and receive a plurality of answers to the plurality of questions, the plurality of questions comprising a first question about prior damage to the vehicle, a second question about liability for the prior damage, and a third question about an accident involving the vehicle.

9. The system of claim 8, wherein the instructions, when executed, further cause the computing device to execute a fraud detection algorithm that performs a comparison between the plurality of answers and the data, and determine whether an insurance claim related to the vehicle is fraudulent based on the comparison.

10. The system of claim 9, wherein the instructions, when executed, further cause the computing device to notify a claims adjuster upon detection of discrepancies between the plurality of answers and the data for manual processing of the insurance claim.

11. The system of claim 1, wherein the instructions, when executed, further cause the computing device to obtain, from a weather condition database, weather information describing a weather condition during an accident involving the vehicle, obtain, from a law enforcement database, a police report of the accident, and obtain, from a medical records database, medical information associated with one or more individuals involved in the accident.

12. The system of claim 1, wherein the analysis location further includes a plurality of lasers.

13. The system of claim 1, wherein the plurality of cameras include a plurality of lenses.

14. A non-transitory computer-readable storage medium having computer-executable program instructions stored thereon that when executed by a processor, cause a computing device to:
    (i) initiate execution of an inspection algorithm that carries out an inspection of a vehicle in response to receiving the vehicle at an analysis location,
        wherein the analysis location includes a plurality of cameras,
        wherein the plurality of cameras are configured to generate data characterizing one or more conditions of the vehicle when the vehicle is at the analysis location, and
        wherein the plurality of cameras are communicatively coupled with the computing device, and the computing device, during execution of the inspection algorithm, controls operation of at least one of the plurality of cameras;

(ii) receive, from the plurality of cameras, the data characterizing the one or more conditions of the vehicle;

(iii) execute an assessment algorithm that causes the computing device to analyze the data and identify damage to the vehicle based on the data; and (iv) execute an estimation algorithm that causes the computing device to estimate an amount to repair the vehicle based, at least in part, on the damage identified.

15. The non-transitory computer-readable storage medium of claim 14, wherein executing the assessment algorithm comprises executing one or more object recognition algorithms that compare one or more images of the vehicle with one or more images of an undamaged vehicle of similar make and model.

16. A method of inspecting a vehicle comprising:

receiving the vehicle at an analysis location wherein the analysis location includes a plurality of cameras and wherein the plurality of cameras are configured to generate data characterizing one or more conditions of the vehicle when the vehicle is at the analysis location, wherein the plurality of cameras are communicatively connected with a computing device comprising memory storing instructions that, when executed, cause the computing device to carry out an inspection of the vehicle by executing an inspection algorithm, and receiving, at the computing device from the plurality of cameras, the data characterizing the one or more conditions of the vehicle;

executing, by the computing device, an assessment algorithm that causes the computing device to analyze the data and identify damage to the vehicle based on the data; and executing, by the computing device, an estimation algorithm that causes the computing device to estimate an amount to repair the vehicle based, at least in part, on the damage identified.

17. The method of claim 16, further comprising: receiving, from a device configured to automatically detect vehicle accidents, a first notice of loss related to the vehicle in response to detecting, by the device, an accident involving the vehicle.

18. The method of claim 17, wherein the first notice of loss comprises telematics information collected by the device during operation of the vehicle.

19. The method of claim 18, wherein the telematics information comprises one or more speed measurements, one or more braking measurements, and one or more acceleration measurements of the vehicle either before, after, or before and after a time the accident occurred.

20. The method of claim 16, wherein the analysis location further includes a plurality of lasers, mechanical devices, tactile sensors, fluid sensors, infrared sensors, and combinations thereof.

* * * * *